United States Patent

[11] 3,569,951

[72] Inventor Jean C. Lavenir
 144 Avenue des Etats Unis, Versailles
 Jean-Claude Merlin
 1 rue Marcelin Berthelot, Vanves, France
[21] Appl. No. 812,640
[22] Filed Apr. 2, 1969
[45] Patented Mar. 9, 1971
[32] Priority Apr. 5, 1968
[33] France
[31] 147,198

[54] SCANNING AND RECEIVING STATION FOR GRAPHIC SYMBOLS
 4 Claims, 4 Drawing Figs.
[52] U.S. Cl..................................................... 340/324, 315/22
[51] Int. Cl...................................................... G06f 3/14
[50] Field of Search........................................... 340/324.1; 315/22

[56] References Cited
UNITED STATES PATENTS
| | | | |
|---|---|---|---|
| 3,090,889 | 5/1963 | Levinson...................... | 315/20 |
| 3,248,725 | 4/1966 | Low et al....................... | 340/324 |
| 3,334,304 | 8/1967 | Fournier et al. ............... | 156/499 |

Primary Examiner—John W. Caldwell
Assistant Examiner—Marshall M. Curtis
Attorney—Abraham A. Saffitz ABSTRACT: A system for viewing graphic symbols and graphs on the screen of a cathode-ray tube. The graphs are drawn by giving the spot incremental movements along quantified directions or vectors and the incremental advance of the spot is caused by sending to the receiving end of the system binary digit vector words defining the quantified directions. The information relative to the illumination or extinction of the spot is transmitted not by a supplementary bit but by means of a particular combination of two vector words. This combination is a succession of two vector words defining vectors of the same and opposite direction.

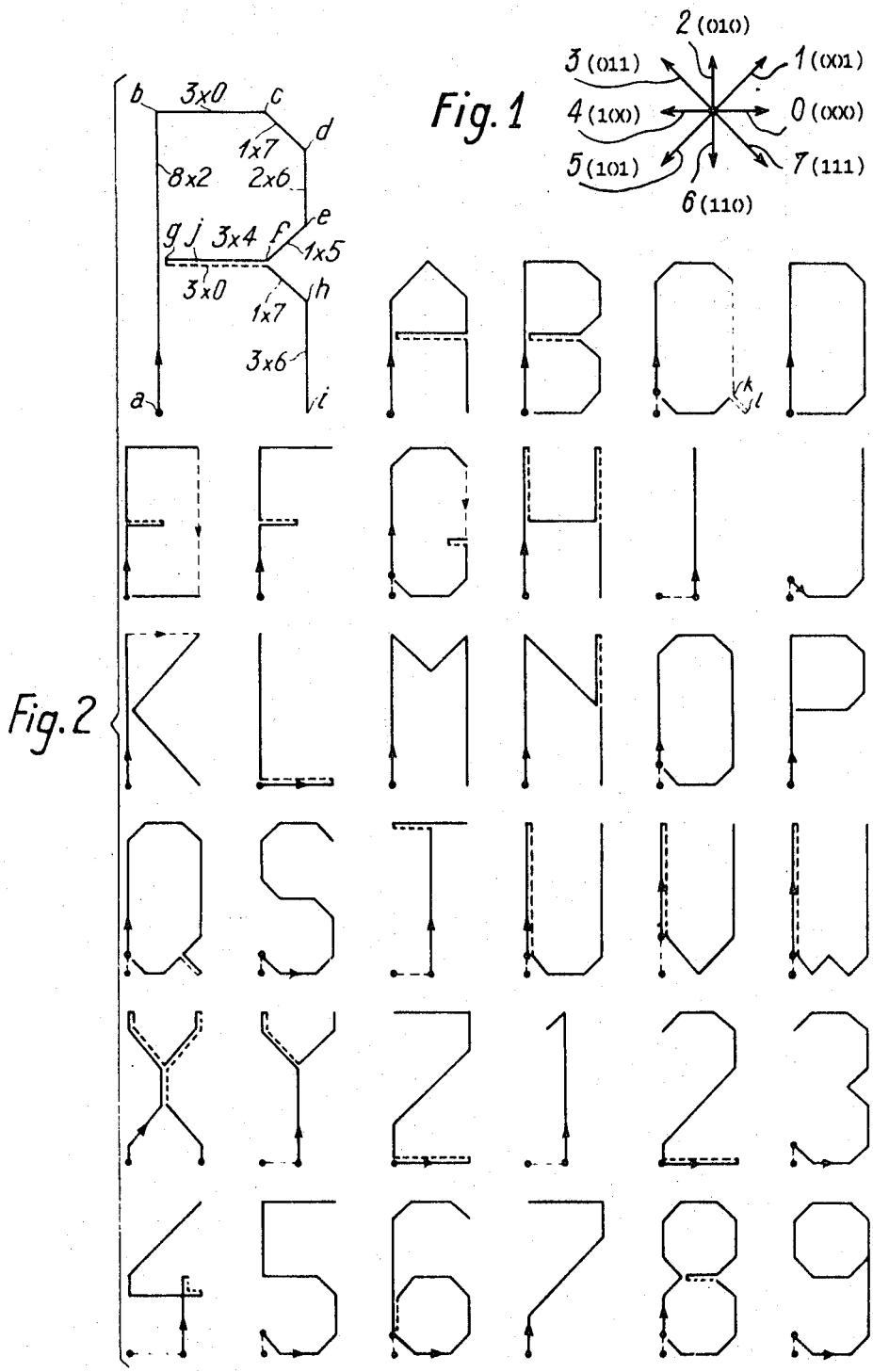

Fig.3

| | |
|---|---|
| A | 2 2 2 2 2 2 1 1 7 7 6 6 4 4 4 4 [40] 0 0 0 0 [73] 6 6 6 6 |
| B | 2 2 2 2 2 2 2 2 0 0 0 7 6 6 5 4 4 4 [40] 0 0 0 [73] 7 6 6 5 4 4 4 |
| C | [40] 2 [73] 2 2 2 2 2 2 1 0 0 7 [40] 6 6 6 6 6 6 [73] 5 4 4 3 |
| D | 2 2 2 2 2 2 2 2 0 0 0 7 6 6 6 6 6 6 5 4 4 4 |
| E | 2 2 2 2 0 0 [40] 4 4 [73] 2 2 2 2 0 0 0 0 [40] 6 6 6 6 6 6 6 6 [73] 4 4 4 4 |
| F | 2 2 2 2 0 0 [40] 4 4 [73] 2 2 2 2 0 0 0 0 |
| G | [40] 2 [73] 2 2 2 2 2 2 1 0 0 7 [40] 6 6 6 6 [73] 4 [40] 0 [73] 6 6 5 4 4 3 |
| H | 2 2 2 2 2 2 2 2 [40] 6 6 6 6 [73] 0 0 0 0 2 2 2 2 [40] 6 6 6 6 [73] 6 6 6 6 |
| I | [40] 0 0 [73] 2 2 2 2 2 2 2 2 |
| J | [40] 2 [73] 7 0 0 1 2 2 2 2 2 2 2 |
| K | 2 2 2 2 2 2 2 2 [40] 0 0 0 0 [73] 5 5 5 5 7 7 7 7 |
| L | 0 0 0 0 [40] 4 4 4 4 [73] 2 2 2 2 2 2 2 2 |
| M | 2 2 2 2 2 2 2 2 7 7 1 1 6 6 6 6 6 6 6 6 |
| N | 2 2 2 2 2 2 2 2 7 7 7 7 2 2 2 2 [40] 6 6 6 6 [73] 6 6 6 6 |
| O | [40] 2 [73] 2 2 2 2 2 2 1 0 0 7 6 6 6 6 6 6 5 4 4 3 |
| P | 2 2 2 2 2 2 2 2 0 0 0 7 6 6 5 4 4 4 |
| Q | [40] 2 [73] 2 2 2 2 2 2 1 0 0 7 6 6 6 6 6 5 7 [40] 3 [73] 5 4 3 |
| R | 2 2 2 2 2 2 2 2 0 0 0 7 6 6 5 4 4 4 [40] 0 0 0 [73] 7 6 6 6 |
| S | [40] 2 [73] 7 0 0 1 2 2 3 4 4 3 2 2 1 0 0 7 |
| T | [40] 0 0 [73] 2 2 2 2 2 2 2 2 [40] 4 4 [73] 0 0 0 0 |
| U | [40] 2 [73] 2 2 2 2 2 2 [40] 6 6 6 6 6 6 6 [73] 7 0 0 1 2 2 2 2 2 2 2 |
| V | [40] 2 2 [73] 2 2 2 2 2 2 [40] 6 6 6 6 6 6 [73] 7 7 1 1 2 2 2 2 2 2 |
| W | [40] 2 [73] 2 2 2 2 2 2 [40] 6 6 6 6 6 6 [73] 7 1 7 1 2 2 2 2 2 2 2 |
| X | 2 1 1 2 2 3 3 2 [40] 6 7 7 [73] 1 1 2 [40] 6 5 5 6 6 [73] 7 7 6 |
| Y | [40] 0 0 [73] 2 2 2 2 3 3 2 [40] 6 7 7 [73] 1 1 2 |
| Z | 0 0 0 0 [40] 4 4 4 4 [73] 2 2 1 1 1 1 2 2 4 4 4 4 |
| 1 | [40] 0 0 [73] 2 2 2 2 2 2 2 5 |
| 2 | 0 0 0 0 [40] 4 4 4 4 [73] 2 1 1 1 1 2 2 3 4 4 5 |
| 3 | [40] 2 [73] 7 0 0 1 2 2 3 1 2 2 3 4 4 5 |
| 4 | [40] 0 0 0 [73] 2 2 2 2 [40] 6 0 [73] 4 4 4 4 2 1 1 1 1 |
| 5 | [40] 2 [73] 7 0 0 1 2 2 3 4 4 4 2 2 2 2 0 0 0 0 |
| 6 | [40] 2 [73] 7 0 0 1 2 2 3 4 4 5 [40] 6 6 [73] 2 2 2 2 2 2 1 0 0 7 |
| 7 | 2 2 1 1 1 1 2 2 4 4 4 4 |
| 8 | [40] 2 [73] 2 2 1 3 2 2 1 0 0 7 6 6 5 4 4 [40] 0 0 [73] 7 6 6 5 4 4 3 |
| 9 | [40] 2 [73] 7 0 0 1 2 2 2 2 2 2 3 4 4 5 6 6 7 0 0 1 |
| 0 | [40] 2 [73] 2 2 2 2 2 2 1 0 0 7 6 6 6 6 6 6 5 4 4 3 |

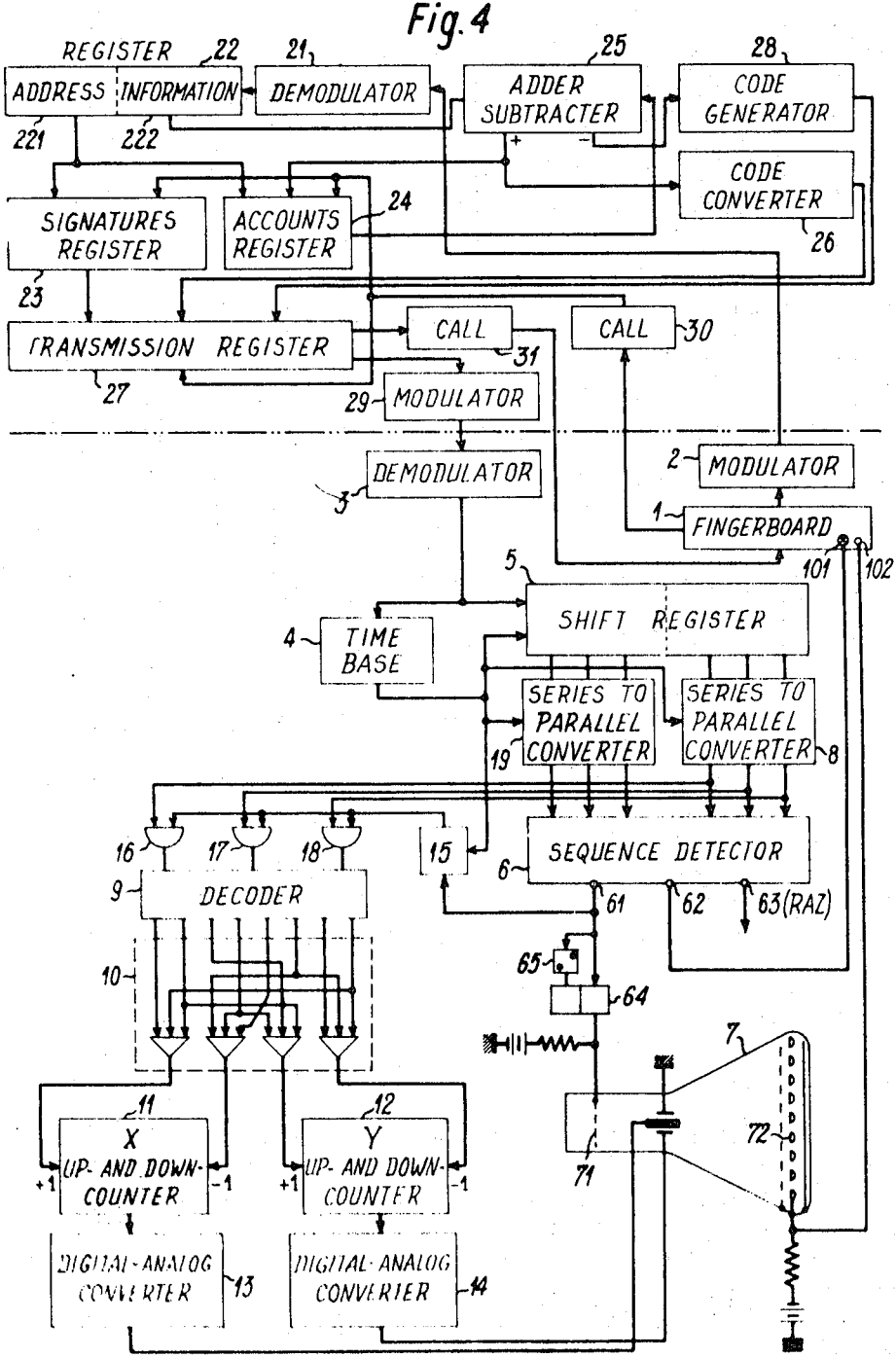

SCANNING AND RECEIVING STATION FOR GRAPHIC SYMBOLS

The present invention relates to a scanning and receiving station for graphic symbols, and as figures, words or drawings, which station may be connected locally or remotely to a memory containing the said symbols in numerical form.

The said scanning and receiving station for symbols was designed to enable an operator to receive alpha-numerical data in written form and graphic data simultaneously on a memory cathode-ray tube screen. For example, the scanning and receiving station which will be described in detail below is intended to assist the staff of a bank or postal check service by affording them access to a central record of signatures and to obtain information regarding the credit balance in a given account among a number of accounts with a view to honoring a check only after the signature and balance of the drawer have been ascertained.

The alpha-numerical symbols and words such as signatures are shown in this station on a cathode-ray tube of the viewing storage type. Such tubes are well known in the art and are described, for instance in the article by M. Knoll and B. Kazan; Viewing storage tubes, Advances in electronics and Electron Physics, Academic Press, New York 1956, pp. 447—501. However, since the words to be visualized do not belong, like the alpha-numerical symbols, to a finished assembly, they cannot be preformed either in the form of diaphragms in the tube itself or in the form of analogue signals of deflection on two rectangular axes.

The words are traced on the screen of the viewing storage tube in the form of increments of rectilinear displacement of the spot of predetermined length and quantified directions. If we assume that the number of quantified directions of displacement of the spot is eight, i.e. the horizontal towards the left and the right, the vertical upwards and downwards the first ascending and descending bisectors and second ascending and descending bisectors, and that the displacement of the spot has a predetermined value on the horizontal and the vertical and the same value multiplied by $\sqrt{2}$ on the bisectors, each letter may be described by converting into deflection signals successive words of three binary elements representing the stages of directional quantification. Thus, if the spot is able to move in any one of eight quantified directions at angles of 45° relatively to one another, the incrementally traced words or vector words have three binary figures if the number of quantified directions was 16 at angular intervals of 22°30′ the incrementally traced words would have four binary figures.

Since the alpha-numerical symbols of the words or numbers shown on the screen of the cathode ray tube are separated from one another by an interval and the various parts of a signature (thus the Christian name and surname) or of a drawing may be separated by an interval, it is necessary to transmit, in addition to direction data, information regarding lighting or the extinction of the spot. It is thus necessary to provide at least two signals, viz "lighting of spot" and "extinction of spot." Where the vector words have three binary figures, it would thus be necessary to have four binary figures in order to translate both the vector and the illumination. Other signals may be necessary or useful, i.e. "end of work" or "return to zero."

It is thus clear that in order to trace a letter, sign or drawing in a continuous manner, it may be necessary to pass over the same line twice. If the line was traced on the way out, it is useless to retrace it on the return. Thus, if the word which designates the ascending vertical is 2 = 010 and that designating the descending vertical is 6 = 110 and if the spot describes the ascending vertical and then returns along the same path, the reflection of the spot is expressed by the transition 2—6 or (010)—(110). If the transitions marking the reflections of the spot, viz.

0—4 or (000)—(100)
4—0 or (100)—(000)
1—5 or (001)—(101)
5—1 or (101)—(001)
2—6 or (010)—(110)
6—2 or (110)—(010)
3—7 or (011)—(111)
7—3 or (111)—(011) are chosen to represent the function signals, the result is that the vector words alone allow the word to be traced, the functions being deduced from successions of consecutive words. As the function relating to a given vector, particularly the information "Must the vector be described with spot illuminated or extinguished?" depends not simply on the vector given but on the consecutive vector, the tracing of the spot must only be released with one word delay with respect to the word determining this trace.

The invention will now be described in detail with reference to the accompanying drawings, in which:

FIG. 1 exemplifies the quantification of the directions of movement of a spot;

FIG. 2 shows the tracing of 26 letters of the alphabet and ten decimal figures.

FIG. 3 gives the codes for description of the alpha-numerical symbols; and

FIG. 4 shows a scanning and receiving station for words operating in conjunction with a signature memory and account memory.

The signatures or, more generally, the words are stored in a central memory in digital form or, to be more exact, in the form of a sequence of words of three binary figures. To be more accurate, the rectilinear elementary course followed by the spot may be in any one of eight directions which are numbered from 0 to 7 in FIG. 1. In relation to a horizontal axis $Ox$ and a vertical axis $Oy$, the eight possible directions are as follows:

Line 0 represented by number 000, directed towards the positive $x$
Line 4 represented by number 100, directed towards the negative $x$
Line 1 represented by number 001, directed towards the first ascending bisector
Line 5 represented by number 101, directed towards the first descending bisector
Line 2 represented by number 010, directed towards the positive $y$
Line 6 represented by number 110, directed towards the negative $y$
Line 3 represented by number 011, directed towards the second ascending bisector
Line 7 represented by number 111, directed towards the second descending bisector.

The length of the line is constant and, for example, equal to 1 mm. when it is directed along the axes of the coordinates. The length is $\sqrt{2}$ greater and is thus $\sqrt{2}$ mm. when the line is directed along the bisectors.

FIG. 2 shows the sequences of vector words representing the various alpha-numerical symbols and their shape. In order to simplify the sequences, there has been marked beside the symbols in FIG. 2 not the vector words themselves but their decimal equivalent. The letter R, for example, is represented by the following vectors (decimal equivalents and binary words).

part $a$—$b$ 8 times 2 = 8 × (010)
part $b$—$c$ 3 times 0 = 3 × (000)
part $c$—$d$ 1 times 7 = 1 × (111)
part $d$—$e$ 2 times 6 = 2 × (110)
part $e$—$f$ 1 times 5 = 1 × (101)
part $f$—$g$ 3 times 4 = 3 × (100)
part $g$—$f$ 3 times 0 = 3 × (000)
part $f$—$h$ 1 times 7 = 1 × (111)
part $h$—$i$ 3 times 6 = 3 × (110)

from which we obtain the sequence of words (decimal equivalents) 2222222220007665444 (40) 000 (73) 7 666

The center bar $f$—$g$ of R is drawn a first time in the direction 4 and a second time in the direction 0. During the first path only the spot has to be illuminated and during the second it may remain extinguished. The transition 4—0 which is in parenthesis is chosen as a signal for the extinction of the spot.

The spot illumination signal will be another transition between two vectors in the same and in a different direction, such as 7—3.

The transition chosen as such a signal may of course be located in the sequence with the meaning required. Thus the transition 4—0 incorporated in the sequence representing the letter R may represent, at its location, that the spot should be extinguished. However, it may also happen that the transition is absent at the point at which the signal should intervene. Thus, at the point f where the spot has to be illuminated in order to trace the course f—h of the letter R, we find the transition 0—7 whereas we would need the transition 7—3. When the signal transition does not exist it should be inserted in the sequence. Thus the group 7—3 in parenthesis has been added in the sequence of the letter R at the point in this sequence corresponding to the point of illumination f. The illumination and extinction vector combinations thus added to the word sequences as shown in FIG. 3 have been omitted from FIG. 2 except for the example shown at the second illumination vector combination in the illustrated letter C.

It should be pointed out that the vectors whose combination represents extinction may be effectively drawn by the spot since the latter is extinguished during the drawing process. However, the vectors whose combination constitutes the illumination signal should not be drawn since they would appear in the form of parasitic lines. In the letter R for example, the insertion of the combination 7—3 at point f in order to illuminate the spot would have nothing against it if it were traced since this would merely mean that the segment f—h were traced three times. However, in the case of the letter C, the drawing by the spot of the illuminating combination at point k would have the disadvantage of introducing the parasitic segment k—e. Two conventions are thus possible; either to treat the illumination and extinction combinations identically and never to trace the vectors constituting the combination, or to treat the illumination and extinction combinations differently and to trace the vectors forming the latter but not those forming the former. The first alternative will be adopted here.

It should also be pointed out that if the combination for the extinction of the spot 4—0 occurs naturally, neither the vector 0 nor the vector 4 are effectively traced. In the case of the second, which is a reflection vector, this is of no importance. But the nontracing of the first vector introduces a gap into the tracing of the letter or word (gap j—g in the letter R). In order to obviate this advantage, the group 4—0 is replaced, where it occurs naturally, by the group 4—4—0—0. This makes it necessary to discriminate, at the end station, the order in which the two successive vectors 4 and 0 appear in order to detect the extinction combination. This also means that it is impossible to use the combination 0—4 for a function since this combination may be introduced when the extinction combination 4—0 is inserted. Thus the total number of combinations available are 4—0, 7—3, 5—1 and 6—2, the inverse combinations 0—4, 3—7, 1—5 and 2—6 will not be suitable for use to represent a function.

It might have been possible to try to represent the extinction combination indifferently by 4—0 or 0—4. I would then have been necessary to use 4—0 whenever the preceding vector was 4 and 0—4 whenever the preceding vector was 0. Thus when the group 4—0 appears naturally it would have had to be replaced by 4—4 —0 and the group 0—4 when it appears naturally would have had to be replaced by 0—0—4—4. However, in this case it would have been difficult to introduce an extinction combination into, say, a zero vector series. In fact, the 0—0 group, when it appears naturally would have had to be replaced by 0—0—4—0—0, thus necessitating the introduction of three vectors instead of two and automatically inserting two extinction combinations, which are redundant.

It is, therefore, more convenient to adapt the combination 4—0 exclusively as the extinction combination and to forbid use of the combination 0—4 to represent a function.

The same reasoning may be effected for the combinations 7—3, 6—2 and 5—1 and it will be assumed in the following paragraphs that this is the solution chosen.

The function combinations which have to be introduced into the sequence representing letters and figures have been framed in order to distinguish them from vector combinations.

Referring to FIG. 4, the scanning and receiving station for words comprises a keyboard 1 followed by a modulator 2, a demodulator 3, a time base generator 4, a shift register 5, a sequence discriminator 6 and a viewing storage tube 7.

The keyboard essentially comprises number keys numbered from 0 to 9, a + key, a − key, a comma key. It is used to transfer the heading of an account and the amount with which this account is to be credited (plus sign) or debited (minus sign). The name of the account and the amount are separated by a comma. The information is transmitted by the keyboard in binary code and is modulated by the modulator 2, demodulated by the demodulator 21 and received in the shift register 22. This shift register has two parts, the first 221 serving as a register of addresses for the signature memory 23 and the account memory 24, while the other 222 serves as an input register for an adding and subtracting system 25.

The adding and subtracting system 25 receives from the account memory 24 the actual balance and adds or subtracts the amount transmitted from the keyboard depending upon whether the preceding sign is a plus or minus. The balance, where a credit one, is transmitted by the adding and subtracting system 25 to both the account memory 24 and to a code converter 26 which transforms the binary figures constituting the number leaving the adding and subtracting system 25 into vector sequences. This converter 26 is simply a correspondence table showing the correspondence between the binary numbers of the decimals and the sequences indicated by the decimal figures in FIG. 2, the said sequences of binary numbers. For example, the FIG. 1 (001 in binary form) is expressed by the equivalent in decimals coded in binary form as $$4\ 0\ 2\ 2\ 2\ 2\ 2\ 2\ 2\ 2\ 5,$$

that is to say: 100—000—010—010—010—010—010—010—010—010—101. The output of the converter 26 is connected to the transmission register 27.

If the balance of the account leaving the adding and subtracting mechanism 25 is a debit one, the signal is transmitted to a code generator 28 which produces the vector sequences of the two letters NO according to the code shown in FIG. 2. The output of the code generator 28 is connected to the transmission register 27. The output of the record memory for signatures is also connected to the transmission register 27. The latter is connected to the word scanning and receiving system through the modulator 29 and the demodulator 3.

As is conventional in shared-time computers, a call device 30 directly controlled from the keyboard produces a time channel at the scanning station. When the transmission register is full, either with the credit balance of the account and the signature or with the information NO and the signature, a call is sent to the keyboard by the call device 31 and the keyboard initiates transmission of the information by transmitting a new call signal to the device 30.

The information stemming from the signature memory 23 and the account memory 24 is, after demodulation, used to synchronize the time-base generator 4 and is also received by the shift register 5, the number of stages in which is sufficient to contain simultaneously the codes of two successive vectors. In the example quoted, the shift register 5 thus has six stages. The three first stages are connected to the sequence discriminator 6 through the parallel series converter 8 and to the binary decimal decoder 9. The decimal outputs 0 and 7 of the binary decimal decoder 9 are connected, through an assembly of gates 10 to an X-register 11 and a Y-register 12. These registers are adding and subtracting systems each having an adding input + 1 and a subtracting input − 1.

The connections between the outputs of the decoder 9 and the inputs of the adding and subtracting systems 11 and 12 are made so that the decimal number 0 is expressed by + 1 over 10 and 0 over 11
decimal number 1 is expressed by + by 1 over 10 and + 1 over 11 decimal number 2 is expressed by 0 over 10 and + 1 over 11
decimal number 3 is expressed by − 1 over 10 and + 1 over 11
decimal number 4 is expressed by − 1 over 10 and 0 over 11
decimal number 5 is expressed by − 1 over 10 and − 1 over 11
decimal number 6 is expressed by 0 over 10 and −1 over 11
decimal number 7 is expressed by × 1 over 10 and − 1 over 11

The adding and subtracting systems 11 and 12 are each followed by a numerical-analogue transformer 13 or 14. The transformer 13 is connected to the horizontal deviation plates in the viewing storage tube 7 and the transformer 14 to the vertical deviation plates of the tube.

The three final stages of the shift register 5 are also connected to the sequence discriminator 6. The sequence discriminators are well known in the art for detecting predetermined characters in teleprinter connections. They generally consist of a number of bistable elements connected so that in a predetermined overall position a direct current applied to the first of the elements passes through all of them. When the discriminator has detected the combination 4—0, it grounds the terminal 61 and if it detects the combination 7—3 it applies a positive potential to the terminal 61. Since the terminal 61 is connected to the grid 71 of the electron gun of the tube 7 by means of a bistable 64 and an inverter 65, the input beam is illuminated whenever the combination 7—3 is detected and extinguished whenever the combination 4—0 is detected.

The terminal 61 is also connected to a pulse generator 15 which also receives the timing pulses from the time-base generator 4. The pulse generator 15 produces, for every variation in the signal at the terminal 61, a pulse of fixed duration equal to the duration of two vector signals, i.e. the duration of six binary figures. The output of the generator 15 controls three gates 16, 17, 18. It is clear that each variation in the signal on the terminal 61 illuminates or extinguishes the beam and inhibits any incremental modification of the adding and subtracting systems 11, 12, thus preventing the beam when illuminated from positively drawing the vectors whose combination constitutes the illuminating function.

The end-of-picture signal, which concludes each signature, is also represented by a reflection transition and appears on the terminal 62 which is connected to the keyboard 1 on which it illuminates a signalling lamp 101. By pressing the button 102, the operator modifies the potential of the target 72 of the tube 7 in order to extinguish the picture. The return to zero signal of the word scanning and receiving station is received on the terminal 63 and causes the registers, converters, decoder and adding and subtracting systems to return to rest position.

The above description involved a particular shape of letters and from this the sequence of vector signals was deduced. Obviously, the letters might have another form and be small instead of capital letters. The above explanation makes it possible to determine the sequence corresponding to any word.

It was also assumed that the central memory did not transmit to the scanning and receiving station words other than the balance of the account and the signature, in the case of a debit balance, and the word NO and signature in the case of a debit balance. The invention is, of course, not limited to the transmission of particular data and the above description explains the manner in which any type of information in word or picture form may be transmitted.

Finally, the description was made assuming eight quantified directions and signals with three binary figures. It would, of course, be possible to devise a system for the transmission of words using more than eight quantified directions, e.g. 16, and the vector signals would then have four binary signals. By numbering the incremental vectors from 0 to 15, certain combinations 0—8, 8—0, 1—9, 9—1, 2—10, 10—2, 3—11, 11—3, 4—12, 12—4, 5—13, 13—5, 6—14, 14—6, 7—15, 15—7 would then be used as function combinations.

We claim:

1. A system for viewing graphic symbols in which the said symbols are displayed by incremental paths of the spot of a cathode-ray tube, said paths forming vectors of quantified directions defined by binary digit vector words, comprising a cathode-ray viewing storage tube having a grid and deflecting means, a shift register for receiving two successive serial vector words, means for selecting predetermined combinations of pairs of vector words defining functions, means for deriving a function signal from said selection, means for deriving from each of said vector words corresponding to a given direction two component signals proportional to the projections of said direction along two rectangular horizontal and vertical axes, means for applying said two component signals to the horizontal and vertical deflecting means of said storage viewing tube and means for applying said function signal to the extinction grid of said storage viewing tube.

2. A system for viewing graphic symbols in which the said symbols are displayed by incremental paths of the spot of a cathode-ray tube, said paths forming an even plurality of vectors of quantified directions defined by binary digit vector words, said vectors being opposite by pairs, comprising a cathode-ray viewing storage tube having a grid and deflecting means, a shift register for receiving two successive serial vector words, means for selecting predetermined combinations of pairs of vector words, means for deriving a function signal from said selection when the two vector words of the combination define vectors of the same and opposite direction, means for deriving from each of said vector words corresponding to a given direction two component signals proportional to the projections of sad direction along two rectangular horizontal and vertical axes, means for applying said two component signals to the horizontal and vertical deflecting means of said storage viewing tube and means for applying said function signal to the extinction grid of said storage viewing tube.

3. A system for viewing graphic symbols as set forth in claim 2 in which the incremental paths of the spot form a plurality of eight vectors angularly spaced apart by 45° from each other and are defined successively by vector words of three binary digits from 000 to 111, the two vectors of the four pairs of vectors defined by the pairs of vector words, 000 and 100, 001 and 101, 010 and 110, 011 and 111 being of the same and opposite direction, and the predetermined combinations selected by the selecting means are the same pairs of vector words.

4. A system for viewing graphic symbols in which the said symbols are displayed by incremental paths of the spot of a cathode-ray tube, said paths forming vectors of quantified directions defined by binary digit vector words, comprising a cathode-ray viewing storage tube having a grid and deflecting means, a shift register for receiving two successive serial vector words, means for selecting predetermined combinations of pairs of vector words defining functions, means for deriving a function signal from said selection, means for deriving from each of said vector words corresponding to a given direction two component signals proportional to the projections of said direction along two rectangular horizontal and vertical axes, means for applying said two component signals to the horizontal and vertical deflecting means of said storage viewing tube, means for inhibiting said deflecting means and means for applying said function signal to both the extinction grid of said storage viewing tube and said deflecting means.